US008925085B2

(12) United States Patent
Johnson et al.

(10) Patent No.: US 8,925,085 B2
(45) Date of Patent: Dec. 30, 2014

(54) DYNAMIC SELECTION AND LOADING OF ANTI-MALWARE SIGNATURES

(71) Applicant: Microsoft Corporation, Redmond, WA (US)

(72) Inventors: Joseph Johnson, Seattle, WA (US); Vishal Kapoor, Seattle, WA (US); Michael S. Jarrett, Kirkland, WA (US); Ronald L. Thompson, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 13/677,931

(22) Filed: Nov. 15, 2012

(65) Prior Publication Data

US 2014/0137249 A1    May 15, 2014

(51) Int. Cl.
*G06F 21/56*    (2013.01)
*G06F 21/00*    (2013.01)

(52) U.S. Cl.
USPC ............. 726/23; 726/22; 726/24; 726/25; 726/26

(58) Field of Classification Search
CPC ....... G06F 21/564; G06F 21/56; G06F 21/00; H04L 63/20
USPC .................................................. 726/22–26
See application file for complete search history.

(56) References Cited

U.S. PATENT DOCUMENTS

| 8,239,948 | B1 | 8/2012 | Griffin et al. | |
| 2003/0110258 | A1* | 6/2003 | Wolff et al. | 709/225 |
| 2004/0236960 | A1 | 11/2004 | Zimmer et al. | |
| 2008/0301051 | A1* | 12/2008 | Stahlberg | 705/44 |
| 2009/0044273 | A1* | 2/2009 | Zhou et al. | 726/24 |
| 2009/0328221 | A1* | 12/2009 | Blumfield et al. | 726/24 |
| 2010/0077481 | A1* | 3/2010 | Polyakov et al. | 726/24 |
| 2010/0175132 | A1 | 7/2010 | Zawadowskiy et al. | |
| 2010/0242094 | A1 | 9/2010 | Hussain et al. | |
| 2011/0126286 | A1 | 5/2011 | Nazarov | |
| 2011/0239294 | A1* | 9/2011 | Kim et al. | 726/22 |
| 2012/0144489 | A1 | 6/2012 | Jarrett et al. | |
| 2012/0151582 | A1 | 6/2012 | Reasor et al. | |

(Continued)

OTHER PUBLICATIONS

"International Search Report & Written Opinion for PCT Application No. PCT/US2013/070202", Mailed Date: Jan. 31, 2014, Filed Date: Nov. 14, 2013, 12 Pages.

(Continued)

*Primary Examiner* — Joseph P Hirl
*Assistant Examiner* — Kalish Bell
(74) *Attorney, Agent, or Firm* — Henry Gabryjelski; Kate Drakos; Micky Minhas

(57) ABSTRACT

An anti-malware system dynamically loads and unloads additional malware detection signatures based on a collection of data sources that indicate what signatures are relevant to a host machine in its current environment. A signature selector component determines what relevant signatures should be loaded. The signature selector component uses a variety of data sources either individually, or in combination, to determine relevancy of the available malware detection signatures. The anti-malware system dynamically determines which of the available malware detection signatures and classes of signatures are relevant and should be provided to a machine based on available information. The malware detection signatures are obtained and loaded automatically from one or more sources when a threat becomes relevant. A program or application may be blocked from accessing files until the relevant malware detection signatures have been loaded onto the machine.

18 Claims, 3 Drawing Sheets

(56) References Cited

U.S. PATENT DOCUMENTS

2012/0159631 A1* 6/2012 Niemela et al. .................. 726/24
2012/0272318 A1   10/2012 Doukhvalov
2012/0284794 A1* 11/2012 Trent et al. ...................... 726/23
2014/0013434 A1*  1/2014 Ranum et al. ................... 726/24

OTHER PUBLICATIONS

Yang, et al., "Enhancing Mobile Malware Detection With Social Collaboration" In IEEE Third International Conference on Social Computing, Privacy, Security, Risk and Trust, Oct. 9, 2011, pp. 572-576.

Cisco, "Cisco IOS Intrusion Prevention System Deployment Guide," Cisco IOS Intrusion Prevention System (IPS), (downloaded from: http://www.cisco.com/en/US/prod/collateral/iosswrel/ps6537/ps6586/ps6634/prod_white_paper0900aecd8062acfb.html), (7 pages), date unknown.

Splunk, Inc. "Malware Signature Updates," (downloaded from: http://docs.splunk.com/Documentation/PCI/latest/Install/MalwareSignatureUpdates), (2 pages), date unkown.

Cha, Sang Kil et al., "SplitScreen: Enabling Efficient, Distributed Malware Detection," Journal of Communications and Networks, vol. 13, No. 2, (downloaded from: http://ieeexplore.ieee.org/stamp/stamp.jsp?tp=&arnumber=6157418), pp. 187-200, Apr. 2011.

* cited by examiner

DYNAMIC SELECTION AND LOADING OF ANTI-MALWARE SIGNATURES

BACKGROUND

Antivirus programs protect computer platforms from an ever-increasing number of threats, such as viruses, worms, trojan horses, spyware, adware, and other malware. Malware is typically software, code, scripts, or other content that is designed to disrupt or corrupt computer operation, gather personal or confidential information, or provide unauthorized access to computer systems. Anti-malware applications, such as antivirus software, use malware detection signatures to identify and remove malware from infected machines or to detect and block malware from being loaded on machines. The anti-malware application uses a stored list of malware detection signatures to detect malware. These signatures comprise, for example, characteristics to identify malware including where it may be found on a machine. Existing solutions address this problem by loading signatures for all known threats or using a fixed subset of the signatures.

However, as the list of threats increases, it can be difficult to protect against all potential threats and to identify which subset should be used for a particular machine. To reduce the amount of storage space required for malware detection signatures, it is advantageous to protect against only relevant threats for a given machine. However, due to the networked nature of many computer platforms and architectures, the list of relevant threats often includes more than just the threats that are capable of running on or targeted to a given computer platform and architecture. Instead, the list of relevant also includes threats to other machines in the network or user's environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The anti-malware application disclosed herein changes the way signatures are loaded so that only relevant malware detection signatures are used by the application. An updated signature loading module works with more than just static local signatures; it is capable of loading signatures from multiple sources. Additionally, a new signature selector component determines what relevant signatures should be loaded. The signature selector component can take advantage of a variety of data sources either individually, or in combination, to determine relevancy of the available malware detection signatures.

In one embodiment, in addition to monitoring threats that are capable of running on or targeted to a given computer platform and architecture, an anti-malware system dynamically loads and unloads additional malware detection signatures based on a collection of data sources that indicate what signatures are relevant to a host machine in its current environment. Information that determines the relevance of various malware detection signatures includes, but is not limited to, machine operating system, platform architecture, installed software, recent detections on other machines in the same network, patch level of the machine, administrator selection, and global threat data.

The anti-malware system dynamically determines which of the available malware detection signatures and classes of signatures are relevant and should be provided to a machine based on available information. The malware detection signatures are obtained and loaded automatically from one or more sources when a threat becomes relevant. In one embodiment, a program or application is blocked from accessing files until the relevant malware detection signatures have been loaded onto the machine.

In various embodiments, determining what malware detection signatures are relevant may include, for example, a local system configuration, such as hardware and software profiles, detection data from other machines on the same network or used within the same organization, correlations between threats determined either manually or automatically through telemetry. Telemetry from the ecosystem may also be used to provide cloud-based services for identifying global- and geographic-relevance for malware detection signatures.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
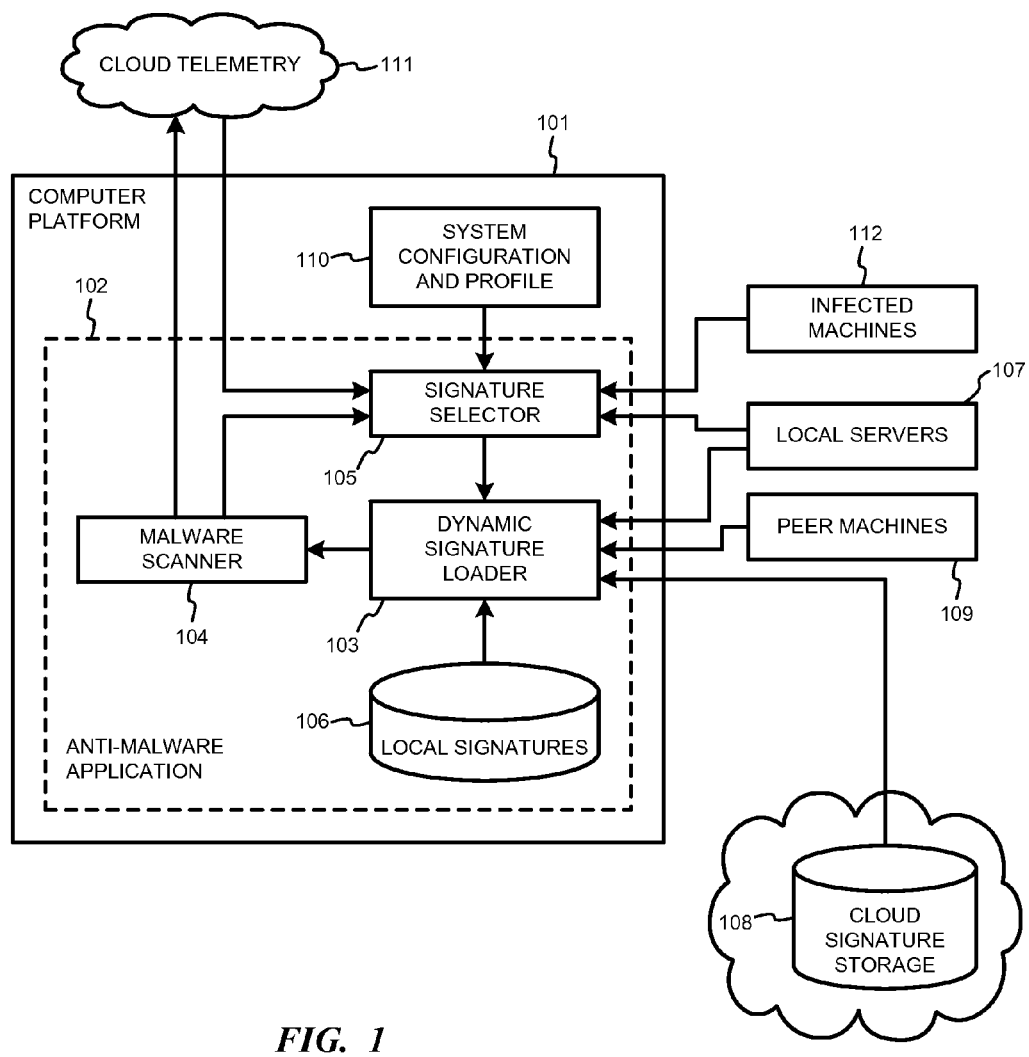
FIG. 1 is a block diagram of a computer platform or machine running a signature-based anti-malware application according to one embodiment.

FIG. 1 is a block diagram of a computer platform 101 or machine running a signature-based anti-malware application 102 according to one embodiment. Computer platform or machine 101 may be any processor-based device such as a server, desktop, or laptop computer, tablet, smartphone, personal digital assistant, point-of-sale device, terminal, telematics equipment, and the like. A dynamic signature loader 103 has the ability to add signatures on the fly to a malware scanner 104 based upon instructions from a signature selector 105. The dynamic signature loader 103 incorporates the ability to locate a signature that is not currently loaded onto malware scanner 104 by searching one or more signature repositories. In the simplest case, dynamic signature loader 103 loads signatures from a local storage 106, such as a local cache, drive, or disk. Dynamic signature loader 103 also loads any additional data required to make the signatures available for scanning.

In other embodiments, the dynamic signature loader 103 is capable of obtaining signatures and any related data that it needs from a number of sources. The dynamic signature loader 103 may start, for example, at a local disk 106 and then query additional locations to provide a more comprehensive and more expansive search for relevant signatures.

For example, in the case of an ARM machine looking for an x86 malware detection signature, if the x86 signatures were not available locally in storage 106, then dynamic signature loader 103 may query a local network signature server 107 or contact a central signature server or storage 108 maintained by an anti-malware provider. The dynamic signature loader 103 may even initiate a peer-to-peer request to another machine 109 on the local network to obtain the required signature from another machine's local store.

Additionally, the dynamic signature loader 103 supports loading a class of signatures or a related set of signatures. These classes or related sets of signatures may be identified by the platform associated with the malware detected by a given signature. For example, a class of signatures for the Win32 platform associated with the Win32/Alureon family of data-stealing trojans. Another class of signatures, for example, may be based on the type of software affected by the malware, such as malware that exploits .docx files.

The relevant signature selector 105 uses data from the machine 101, such as system configuration and profile data 110, the local network, such as local servers 107, and cloud 111 to determine what signatures the dynamic signature loader 103 should load. The signature selector 105 may select individual signatures or classes of signatures to load based upon static and/or dynamic attributes of the signatures.

Cloud telemetry 111 may be used to aggregate malware data on a global scale. This global data can be used to determine which signatures should be loaded for currently active malware. In one embodiment, the cloud system 111 aggregates the malware data and provides that data to the signature selector 105 for interpretation. Using the aggregated malware data, the signature selector 105 can make detailed decisions about which signatures to load and can use that data to support other features. In other embodiments, the cloud system 111 analyzes the global malware data and provides recommendations or instructions to the signature selector 105 regarding which signatures the selector should consider loading. The aggregated malware data may be processed for signature selection in the cloud system 111. This would eliminate the need to distribute large amounts of malware data to each signature selector 105 and would minimize the distribution proprietary malware collection and analysis data.

Subcomponents of signature selector 105 may handle specific classes of data. A machine hardware and software subcomponent of selector 105 identifies signatures for malware that directly impacts the current system 101. For machine hardware and operating system, the selection criteria address whether or not a given piece of malware is physically capable of running on the current machine. For example, x86 threats cannot run on an ARM-based device; however, x86 threats can run on a 64-bit Windows®. Malicious web content potentially will run on any of these devices.

Some malware especially exploits and scripts, can only run on a machine with certain required software installed and may run only on some versions of that software. The signature selector 105 keeps track of installed software types and versions, and selector 105 loads the signatures for exploits and scripts that can affect the software actually loaded on the local machine 101. For example, malware scanner 104 may detect what software has been loaded on the machine 101 and then notify the selector 105 that new software has loaded. File access from that new software may be blocked until the relevant malware detection signatures for the software have been loaded.

In the case of locally detected malware, the selector 105 will query other data sources, such as local signatures or cloud-based data, to identify related threats for which signatures are not loaded. Once the first piece of malware is seen, selector 105 looks for related signatures that are relevant to clean the system of residual threats, even if those threats cannot run on the machine 101. For example, if web-based malware that is known to target document files is detected on a machine that does not have word processing software installed, the selector 105 looks for relevant signatures to prevent passing the malware to other machines on the network or to protect other non-word processing applications that might use the document files.

When other machines 112 in the same network are infected with malware, especially a worm, it is very likely copies of that malware will spread to other machines on the network, regardless of whether the malware can run on the other machines. In this case, the selector 105 may receive a report of the malware from infected machine 112 and/or from a local server 107 that instructs all machines in the network to load signatures for that malware until all of the machines have completed a system scan to rid the environment of the threat. The communication of threats that are relevant in this way can either be handled by a central reporting server, a cloud management server for that network, or peer-to-peer communications within the network.

In addition to the above-described automatic selection of relevant signatures, a local or network administrator may specify additional signatures that are relevant in addition to any automatic selections made by signature selector 105.

For example, in the case of a home user with a smartphone that does not have anti-malware protection, the user may turn on threat detection for the smartphone-docking software on the machine that is used to sync the smartphone to prevent malware from spreading to the smartphone from the machine. In another example, in a very heterogeneous enterprise, a network administrator may enable scanning for all of the prevalent hardware\operating system configurations on all machines. Additionally, in the example of blacklisted applications and targeted attacks, network administrators may deploy local custom signatures to machines. To handle all of these cases, the signature selector 105 will allow configuration overrides to add additional signatures based on the above criteria or always.

In the case of widespread threats, the "network" that is relevant for controlling the spread of malware may be the entire Internet or at least a geographically localized region of the Internet. As the machines' environment becomes more heterogeneous, the ability to flag a threat for detection on all hosts—and not just those machines that can run the malware—will become important for cleaning the overall network "ecosystem." In such cases, the selector 105 may consider a signature as relevant as long as a cloud service 111 says that it is. Additionally, a cloud service 111 may automatically add threats and signatures to a relevant malware list based on telemetry from all clients running a particular anti-malware solution.

Another variant of using prevalence data is to explicitly not load signatures or unload signatures for threats that are no longer seen, regardless of whether or not that threat is capable of actually running on a given machine. For example, some malware signatures may apply to threats that are seen only in scans of researchers' collections, while others may apply to threats seen only in certain countries. While these threats are not relevant in the consumer space, they are still potentially in a multi-national enterprise. So the selector 105 would only drop these signatures if configured to do so.

Dynamic signature loader 103 may load signatures for specific durations in some cases. For example, signature selector 105 may identify a threat or potential threat that will last for a particular period. Dynamic signature loader 103 may load signatures for that time-bound threat for a specific number of hours and then unload the signatures when the threat period has elapsed.

It will be understood that machine 101, local servers 107, peer machines 109, and infected machines 112 may be physical machines, such as a server, a desktop, notebook, or laptop computer, a smartphone, a personal digital assistant (PDA), or the like. In some embodiments, one or more of machine 101, local servers 107, peer machines 109, and infected machines 112 may be a virtual machine (VM) or a software implementation of a machine that is running on a host device.

For example, in one embodiment, machine 101, local servers 107, peer machines 109, and infected machines 112 may be different virtual machines running on the same or different servers, such as servers within a data center. The virtual machines may belong to one or more tenants or customers with such a data center. The processes and techniques described herein may be used to select which signatures should be used by anti-malware applications running on the virtual machines. In addition to the selection criteria discussed above, the signature selector 105 may choose signatures based upon current or expected conditions or states within the data center, such as the type of applications running on one or more virtual machines or host devices, the type of tenants using the data center (e.g., short-term tenants, long-term tenants, or tenant identity), the bandwidth used or the number of transactions supported by a tenant or virtual machine, and the like.

Figure 2:
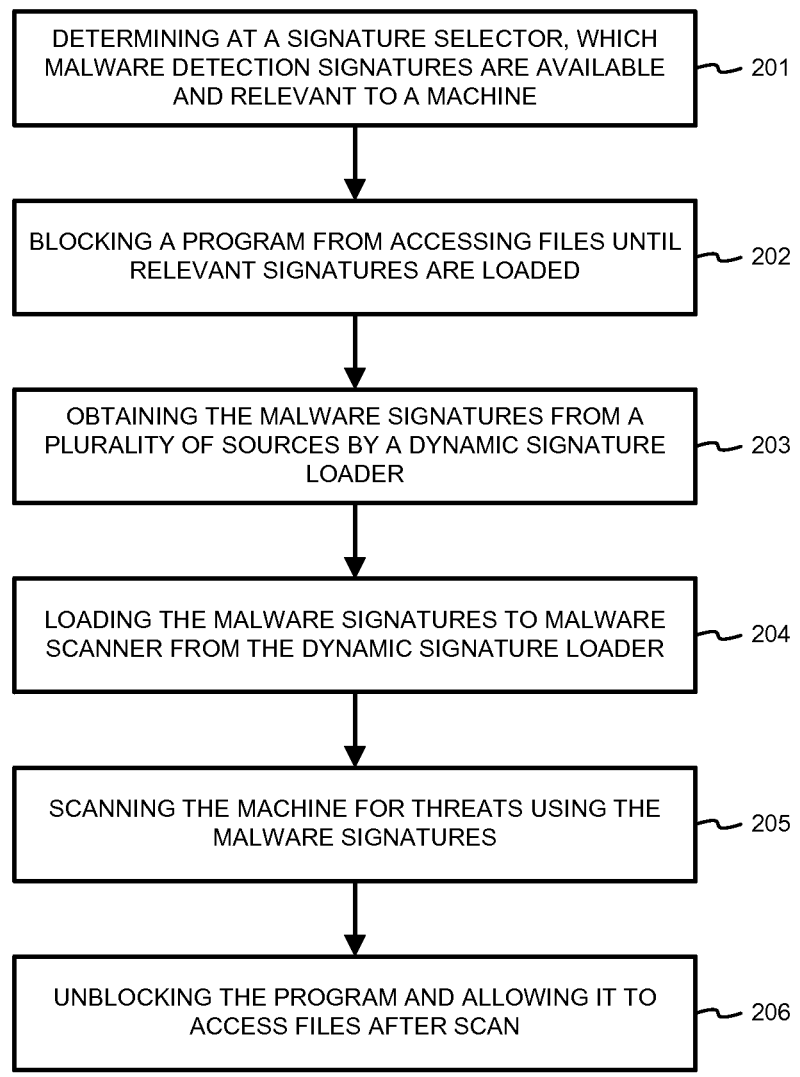
FIG. 2 is a flowchart of a method or process for loading relevant malware detection signatures according to some embodiments.

FIG. 2 is a flowchart of a method or process for loading relevant malware detection signatures according to some embodiments. The process dynamically loads and unloads malware detection signatures based on multiple data sources that indicate which signatures are relevant to a machine in its current environment.

In step 201, a signature selector determines which malware detection signatures are available and relevant to a machine. The signature selector determines relevance, for example, based upon the operating system, architecture, installed software, and patch level on a particular machine and based upon recent detections on other machines in the same network, administrator selections, and global threat data. This information may come from a number of information sources that allow the signature selector to dynamically determine which signatures and classes of signatures are available and relevant to a given computer. A local system configuration, including hardware and software profiles, may be used, for example, to determine signature relevance. Additionally, detection data from other computers on the same network or in the same organization may be used to determine signature relevance. In other embodiments, correlations between threats identified either manually or automatically through telemetry are used to determine signature relevance. Telemetry may be received from other machines in the same network or from a central server associated with an anti-malware application to provide cloud based services for determining global and geographic relevance of malware detection signatures.

In step 202, a program may be blocked from accessing files until the signatures that are relevant to the program are loaded. This prevents the program from being infected or adversely affected by malware.

In step 203, a dynamic signature loader automatically obtains and loads malware signatures from one or more sources when a threat becomes relevant. These sources may include machines and servers on the same or remote networks or on the cloud. In step 204, the malware signatures are loaded to a malware scanner by the dynamic signature loader.

The malware scanner scans the machine for threats using the malware detection signatures in step 205. Once the machine has been scanned, any blocked programs are unblocked in step 206 and then allowed to access files on the machine.

It will be understood that steps 201-206 of the process illustrated in FIG. 2 may be executed simultaneously and/or sequentially. It will be further understood that each step may be performed in any order and may be performed once or repetitiously.

Figure 3:
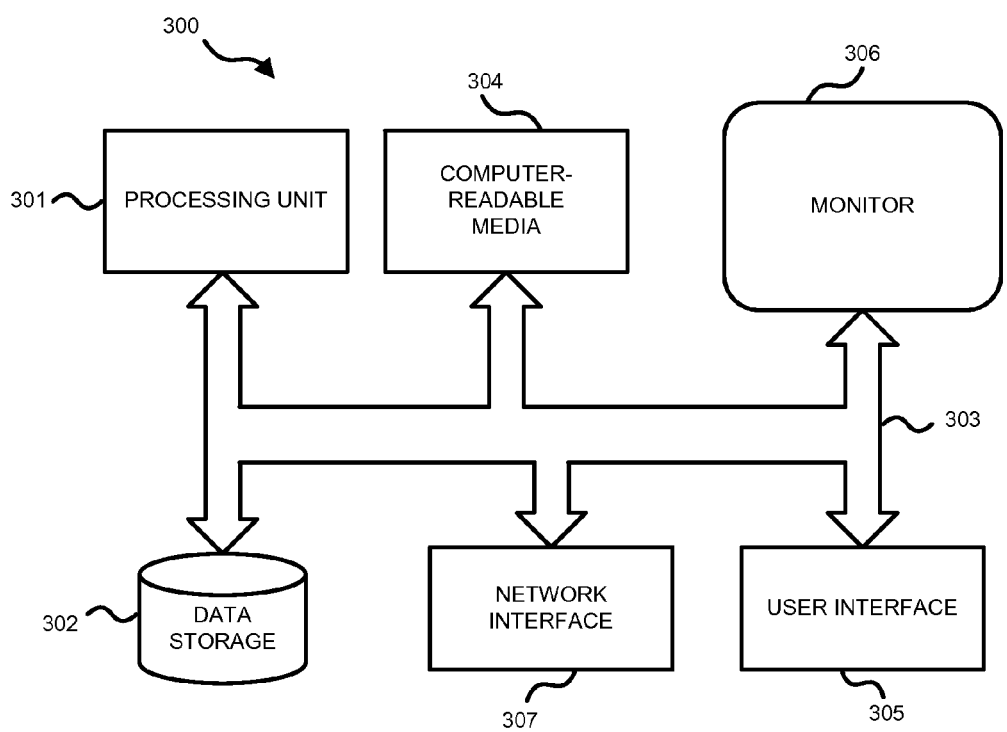
FIG. 3 illustrates an example of a suitable computing and networking environment on which a system for automatically determining and loading relevant malware detection signatures may be implemented in some embodiments.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 300. Components may include, but are not limited to, various hardware components, such as processing unit 301, data storage 302, such as a system memory, and system bus 303 that couples various system components including the data storage 302 to the processing unit 301. The system bus 303 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 300 typically includes a variety of computer-readable media 304. Computer-readable media 304 may be any available media that can be accessed by the computer 300 and includes both volatile and nonvolatile media, and removable and non-removable media, but excludes propagated signals. By way of example, and not limitation, computer-readable media 304 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 302 includes computer storage media in the form of volatile and/or nonvolatile memory such as read only memory (ROM) and random access memory (RAM). A basic input/output system (BIOS), containing the basic routines that help to transfer information between elements within computer 300, such as during start-up, is typically stored in ROM. RAM typically contains data and/or program modules that are immediately accessible to and/or presently being operated on by processing unit 301. By way of example, and not limitation, data storage 302 holds an operating system, application programs, and other program modules and program data.

Data storage 302 may also include other removable/non-removable, volatile/nonvolatile computer storage media. By way of example only, data storage 302 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for the computer 300.

A user may enter commands and information through a user interface 305 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 301 through a user input interface 305 that is coupled to the system bus 303, but may be connected by other interface and bus structures, such as a parallel port, game port or a universal serial bus (USB). A monitor 306 or other type of display device is also connected to the system bus 303 via an interface, such as a video interface. The monitor 306 may also be integrated with a touch-screen panel or the like. Note that the monitor and/or touch screen panel can be physically coupled to a housing in which the computing device 300 is incorporated, such as in a tablet-type personal computer. In addition, computers such as the computing device 300 may also include other peripheral output devices such as speakers and printer, which may be connected through an output peripheral interface or the like.

The computer 300 may operate in a networked or cloud-computing environment using logical connections 307 to one or more remote devices, such as a remote computer. The remote computer may be a personal computer, a server, a router, a network PC, a peer device or other common network node, and typically includes many or all of the elements described above relative to the computer 300. The logical connections depicted in FIG. 3 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 300 may be connected to a public or private network through a network interface or adapter 307. In some embodiments, a modem or other means for establishing communications over the network. The modem, which may be internal or external, may be connected to the system bus 303 via the network interface 307 or other appropriate mechanism. A wireless networking component such as comprising an interface and antenna may be coupled through a suitable device such as an access point or peer computer to a network. In a networked environment, program modules depicted relative to the computer 300, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   determining which malware detection signatures are relevant to a device, including signatures for malware that is not capable of running on the device, but that may affect other machines on a local network that includes the device;
   automatically obtaining the relevant malware detection signatures;
   loading the relevant malware detection signatures to a malware scanner;
   scanning the device using the relevant malware detection signatures; and
   unloading signatures for threats that are no longer relevant to the device.

2. The computer-implemented method of claim 1, further comprising:
   determining which malware detection signatures are relevant to the device based upon the device's hardware configuration or software configuration or both.

3. The computer-implemented method of claim 1, further comprising:

determining which malware detection signatures are relevant to the device based upon malware detected by one or more other machines on the device's network.

4. The computer-implemented method of claim 1, further comprising:
determining which malware detection signatures are relevant to the device based upon a configuration of one or more other machines on the device's network.

5. The computer-implemented method of claim 1, further comprising:
determining which malware detection signatures are relevant to the device based upon data aggregated on a global scale.

6. The computer-implemented method of claim 1, further comprising:
determining which malware detection signatures are relevant to the device based upon a geographic location of the device.

7. The computer-implemented method of claim 1, further comprising:
automatically obtaining the relevant malware detection signatures from one or more signature repositories.

8. The computer-implemented method of claim 1, further comprising:
automatically obtaining the relevant malware detection signatures from a peer machine on the device's network.

9. The computer-implemented method of claim 1, further comprising:
automatically obtaining the relevant malware detection signatures from a local network signature server.

10. The computer-implemented method of claim 1, further comprising:
automatically obtaining the relevant malware detection signatures from a local storage.

11. The computer-implemented method of claim 1, wherein the relevant malware detection signatures comprise one or more classes of signatures, and further comprising:
automatically obtaining signatures for the one or more classes.

12. The computer-implemented method of claim 1, further comprising:
loading the relevant malware detection signatures for a specified duration and then unloading the relevant malware detection signatures.

13. The computer-implemented method of claim 1, further comprising:
blocking one or more programs from accessing files on the device until the relevant malware detection signatures have been loaded.

14. A computer system, comprising:
one or more processors;
system memory;
one or more computer-readable storage media having stored thereon computer-executable instructions that, when executed by the one or more processors, causes the processors to perform a method for automatically determining and loading relevant malware detection signatures, the processor operating to:
determine which malware detection signatures are relevant to a device, including signatures for malware that is not capable of running on the device, but that may affect other machines on a local network that includes the device;
automatically obtain the relevant malware detection signatures;
load the relevant malware detection signatures to a malware scanner;
scan the device using the relevant malware detection signatures; and
unload signatures for threats that are no longer relevant to the device.

15. The computer system of claim 14, the processor further operating to:
determine which malware detection signatures are relevant to the device based upon a hardware configuration or a software configuration of the device.

16. The computer system of claim 14, the processor further operating to:
determine which malware detection signatures are relevant to the device based upon a configuration of one or more other machines on the device's network.

17. The computer system of claim 14, the processor further operating to:
block one or more programs from accessing files on the device until the relevant malware detection signatures have been loaded.

18. A computer program product for implementing a method for automatically determining and loading relevant malware detection signatures, the computer program product comprising one or more computer-readable storage media having stored thereon computer-executable instructions that, when executed by one or more processors of a computing system, cause the computing system to perform the method comprising of:
determining which malware detection signatures are relevant to a device, including signatures for malware that is not capable of running on the device, but that may affect other machines on a local network that includes the device, wherein the relevant malware detection signatures are determined based upon
a hardware configuration or a software configuration of the device,
malware detected by one or more other machines on a local network,
a configuration of one or more other machines on the device's network,
data aggregated on a global scale, or
a geographic location of the device;
blocking one or more programs from accessing files on the device until the relevant malware detection signatures have been loaded;
automatically obtaining the relevant malware detection signatures;
loading the relevant malware detection signatures to a malware scanner;
scanning the device using the relevant malware detection signatures; and
unloading signatures for threats that are no longer relevant to the device.

* * * * *